United States Patent
Kvernvik

(10) Patent No.: US 9,584,622 B2
(45) Date of Patent: Feb. 28, 2017

(54) METHOD FOR NETWORK CONTROLLED ACCESS SELECTION

(75) Inventor: Tor Kvernvik, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1947 days.

(21) Appl. No.: 12/674,821

(22) PCT Filed: Aug. 23, 2007

(86) PCT No.: PCT/SE2007/050577
§ 371 (c)(1),
(2), (4) Date: Feb. 23, 2010

(87) PCT Pub. No.: WO2009/025601
PCT Pub. Date: Feb. 26, 2009

(65) Prior Publication Data
US 2011/0128907 A1 Jun. 2, 2011

(51) Int. Cl.
*H04W 4/00* (2009.01)
*H04L 29/08* (2006.01)
*H04L 12/54* (2013.01)
*H04W 76/02* (2009.01)
*H04W 48/18* (2009.01)
*H04W 80/04* (2009.01)
*H04W 88/00* (2009.01)

(52) U.S. Cl.
CPC ........ *H04L 67/306* (2013.01); *H04L 12/5691* (2013.01); *H04L 12/5692* (2013.01); *H04W 76/025* (2013.01); *H04W 48/18* (2013.01); *H04W 80/04* (2013.01); *H04W 88/005* (2013.01)

(58) Field of Classification Search
CPC ..................................................... H04W 80/04
See application file for complete search history.

(56) References Cited

U.S. PATENT DOCUMENTS

| 2004/0218605 | A1 | 11/2004 | Gustafsson et al. |
| 2008/0046995 | A1* | 2/2008 | Satterlee ............. H04L 12/4679 726/15 |
| 2008/0320149 | A1* | 12/2008 | Faccin .......................... 709/228 |
| 2009/0141625 | A1* | 6/2009 | Ghai et al. ..................... 370/230 |

FOREIGN PATENT DOCUMENTS

WO  WO 2005/062652 A1  7/2005

* cited by examiner

Primary Examiner — Samina Choudhry

(57) ABSTRACT

The invention provides an Access Selection Server (ASS) and a method for the same. The invention also provides a User Equipment (UE). The Access Selection Server (ASS) comprises storing means and software and is adapted for location in a communication network comprising at least one User Equipment (UE) and communication nodes. The ASS is also arranged to store information of all accesses for each UE in the communication network and information of overall load status of the communication network in the storing means by means of collecting information through interactions with the communication nodes, the UE and an Access Selection Server subscriber Data Base (ASS DB). The ASS is further arranged to communicate control messages, based on the stored information, from the ASS to the UE, thereby enabling control of multiple UE-accesses from the ASS.

26 Claims, 7 Drawing Sheets

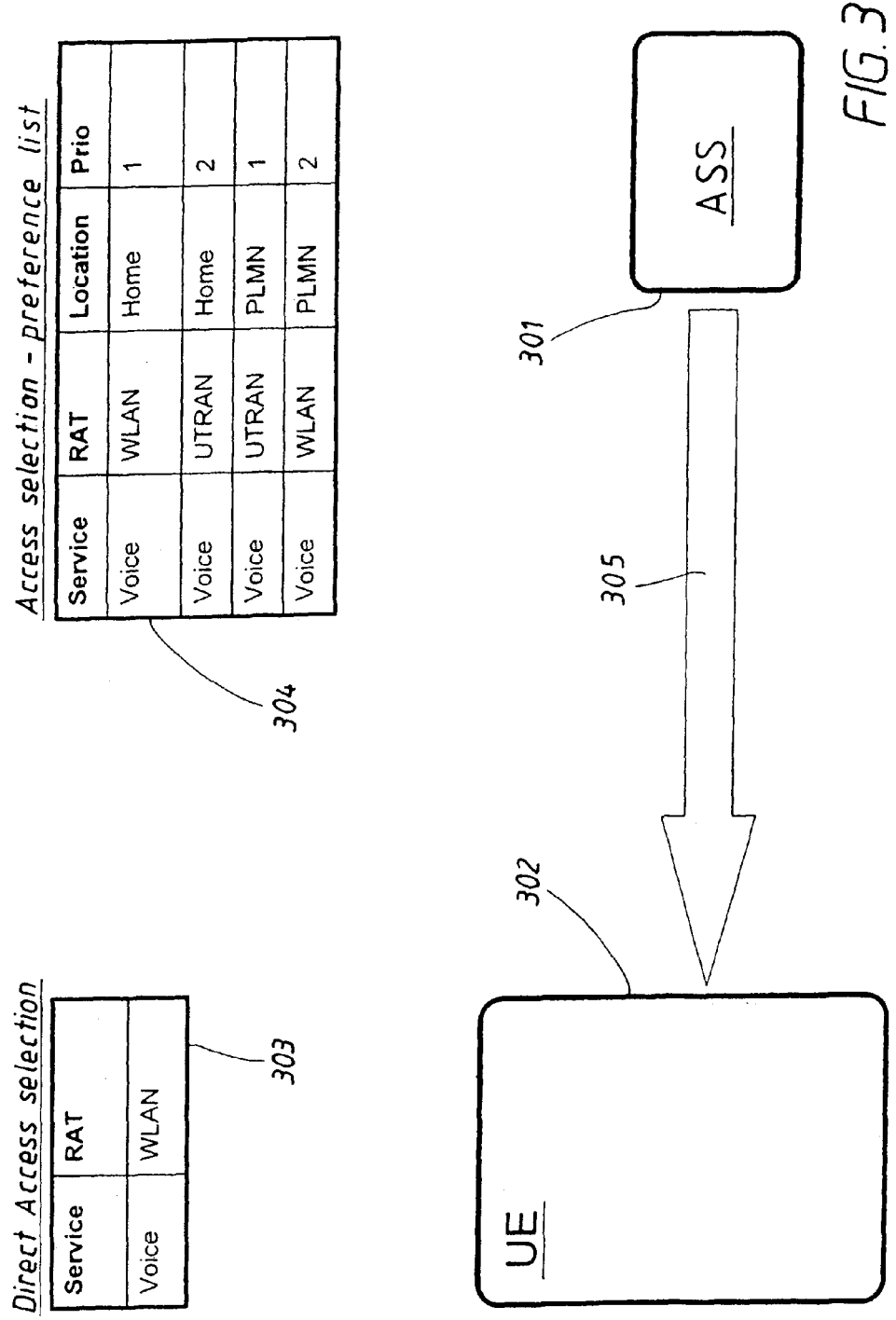

METHOD FOR NETWORK CONTROLLED ACCESS SELECTION

TECHNICAL FIELD

The invention relates to an Access Selection Server (ASS), a corresponding method and a communication system having the advantage of providing increased access selection control from a communication network. The invention also relates to a User Equipment (UE) being equipped to interact with the ASS.

BACKGROUND

Third generation mobile systems (3G), based on WCDMA (Wideband Code Division Multiple Access) radio access technology, are being deployed on a broad scale all around the world. However, as user and operator requirements and expectations will continue to evolve a new phase in the project called $3^{rd}$ Generation Partnership Project (3GPP) has started to consider the next major steps in the evolution of the 3G standard. The terminals used in the network are having more functions integrated which means that an increasing number of access types such as e.g. LTE (Long Term Evolution), WiMAX (Worldwide Interoperability for Microwave Access) and WLAN (Wireless Local Area Network) and new services such as Voice over IP (VoIP) or IP-TV are added to the terminal. This has the implication that there is a need for support from the network to guide the terminal regarding which access to select. The terminal is henceforth in the description and claims called a User Equipment, UE.

In the technical specification 3GPP TS 23.203 v7.3.0, release 7, a new architecture for Policy and Charging Control (PCC) is introduced and the different functions are specified. The PCC architecture is illustrated in FIG. 1. The functions in FIG. 1 are, according to this specification, defined as follows.

The main parts of the PCC architecture consists of an Application Function (AF), 101, a PCRF (Policy and Charging Rules Function), 103, a Subscription Profile Repository (SPR), 107 and a PCEF (Policy and Charging Enforcement Function), 105. These parts are shown in FIG. 1. The PCC also includes an Online Charging System (OCS) connected to the PCEF through a reference point Gy and an Offline Charging System (OFCS) connected to the PCEF through a reference point Gz. The OCS and OFCS are not shown in FIG. 1 as they are not of primary interest for the invention.

The Application Function (AF) 101 is an element offering applications the possibility to request resource allocation, via the PCC, in the network such as e.g. Universal Mobile Telecommunication System (UMTS) Packet Switched (PS) domain or General Packet Radio Service (GPRS) domain resources. One example of an application function is a P-CSCF (Proxy—Call Session Control Function). The P-CSCF is a SIP (Session Initiated Protocol) proxy server which is the first point of contact for an IMS (IP Multimedia Subsystem) User Equipment.

The AF 101 use an Rx reference point 102 to provide session information to the PCRF (Policy and Charging Rules Function) 103. The signalling flow between the AF 101 and the PCRF 103 through the Rx reference point 102 is specified in 3GPP TS 29.213 v7.0.0. More detailed information regarding the PCC over the Rx reference point is specified in 3GPP TS 29.214 v7.0.0.

The PCRF 103 is a functional element that encompasses policy control decision and flow based charging control functionalities. These 2 functionalities are the heritage of the 3GPP release 6 logical entities PDF (Policy Decision Function) and CRF (Charging Rules Function) respectively. The PCRF provides network control regarding the service data flow detection, gating, QoS (Quality of Service) and flow based charging (except credit management) towards the PCEF (Policy and Charging Enforcement Function). The PCRF receives session and media related information from the AF and informs the AF of traffic plane events.

A Gx reference point 104 is located between the PCRF and the PCEF. The Gx reference point is used for provisioning and removal of PCC rules from the PCRF to the PCEF and the transmission of traffic plane events from the PCEF to the PCRF. The stage 2 level requirements for the Gx reference point are defined in 3GPP TS 23.203 v7.3.0, release 7.

Signalling flows between the PCRF and the PCEF through the Gx point 104 is specified in 3GPP TS 29.213 v7.0.0. More detailed information regarding the PCC over the Gx reference point is specified in 3GPP TS 29.212 v7.0.0.

The PCC contains a number of rules defining how to treat received data packages. The purpose of a PCC rule is to:
Detect a packet belonging to a service data flow.
 The service data flow filters within the PCC rule are used for the selection of downlink IP-CAN (Internet Protocol Connectivity Access Network) bearers. An IP-CAN bearer is an information transmission path of defined capacity, delay, bit error rate e.t.c. When using GPRS (General Packet Radio Service) the IP-Connectivity Access Network (IP-CAN) bearers are provided by Packet Data Protocol (PDP) contexts.
 The service data flow filters within the PCC rule are used for the enforcement that uplink IP flows are transported in the correct CIP-AN bearer.
Identify the service the service data flow contributes to.
Provide applicable charging parameters for a service data flow.
Provide policy control for a service data flow.

The PCEF shall select a PCC rule for each received packet by evaluating received packets against service data flow filters of PCC rules in the order of the precedence of the PCC rules. When a packet matches a service data flow filter, the packet matching process for that packet is completed, and the PCC rule for that filter shall be applied.

There are two types of procedures for activation of rules:
Rules activated at IP-CAN establishment/modification/deactivation.
Rules activated/modified/deactivated at application session setup/modification/deactivation.

A PCC rule consists of:
a rule name;
service identifier;
service data flow filter(s);
gate status;
QoS parameters;
charging key (i.e. rating group);
other charging parameters.

The PCEF is the functional element that encompasses policy enforcement and flow based charging functionalities. These 2 functionalities are the heritage of the 3GPP release 6 logical entities PEP (Policy Enforcement Point) and TPF (Traffic Plane Function) respectively. This functional entity is located at a Gateway 106 e.g. a Gateway GPRS Support Node (GGSN) in the GPRS (General Packet Radio Service) case. It provides control over the user plane traffic handling at the Gateway and its Quality of Service (QoS), and provides service data flow detection and counting as well as online and offline charging interactions.

For a service data flow that is under policy control the PCEF shall allow the service data flow to pass through the Gateway 106 if and only if the corresponding gate is open.

The Subscription Profile Repository function (SPR) 107 contains all subscriber/subscription related information needed for subscription-based policies and bearer level charging rules by the PCRF. The SPR may be combined with other databases in the operator's network.

The Sp reference point 108, between the SPR and the PCRF, allows the Subscription Profile Repository (SPR) to provide subscription-based input to the PCRF. The Sp reference point allows the PCRF to request subscription information related to bearer level policies from the SPR based on subscriber ID. The subscriber ID can e.g. be IMSI (International Mobile Subscriber Identity). The reference point allows the SPR to notify the PCRF when the subscription information has been changed if the PCRF has requested such notifications.

In the 3GPP TS 23.203 v7.3.0, release 7, PCC architecture the PCRF has got a passive role in the access selection procedures. At IP-CAN establishment the Radio Access Technology (RAT) type is sent to the PCRF. The PCRF is able to reject the IP-CAN establishment e.g. in case the RAT type is not according to the user's profile. The PCRF has no active role in the selection of the access type. The decision of what access to use within one access type (e.g. 2.5 G vs. 3G) is typically controlled via interactions between the UE and the radio network. The decision, about which access types to select, if there are multiple access types (e.g. WLAN and WCDMA) available, is today mainly controlled by the UE.

With the existing solution there is no mechanism available that can enable control from the network regarding which access type to select. The selection of access type is primarily controlled by the UE.

This means that there are limited possibilities in prior art solutions of today for the network provider to control the access selection and guide the user to a certain access e.g. in order to:

Optimize the network load by suggesting the UEs to use the most cost effective access type when the UE is in e.g. a hot spot area.

Control that the UE uses the access type that is most appropriate for the application.

The current PCC architecture can handle several parallel IP-CANs for the same UE but the architecture demands that each IP-CAN is treated individually. This means that there is no place in the network with a full control of all active accesses for one user. This also means that there are limited possibilities for the network to orchestrate between the different accesses.

SUMMARY

The invention intends to remove the above mentioned deficiencies with prior art solutions and to find an improved solution to control multi accesses for a User Equipment (UE) in a communication network. This is accomplished by providing:

An Access Selection Server (ASS) comprising storing means and software. The ASS is adapted for location in a communication network comprising at least one User Equipment (UE) and communication nodes wherein the ASS is arranged to allow each UE to have multiple accesses to at least one Packet Data Network Gateway (PDN GW) being part of the communication network, each access comprising one IP-session. The ASS is also arranged to store information of all accesses for each UE in the communication network and information of overall load status of the communication network in the storing means by means of collecting information through interactions with the communication nodes, the UE and an Access Selection Server subscriber Data Base (ASS DB). The ASS is further arranged for communicating control messages, based on the stored information, from the ASS to the UE, thereby enabling control of multiple UE-accesses from the ASS.

A method for an Access Selection Server (ASS) comprising storing means and software. The ASS is located in a communication network, the communication network comprising at least one User Equipment (UE) and communication nodes wherein the ASS allows each UE to have multiple accesses to at least one Packet Data Network Gateway (PDN GW) being part of the communication network, each access comprising one IP-session. The ASS further stores information of all accesses for each UE in the communication network and information of overall load status of the communication network in the storing means by collecting information through interactions with the communication nodes, the UE and an Access Selection Server subscriber Data Base (ASS DB). The ASS also communicates control messages, based on the stored information, from the ASS to the UE, thereby enabling control of multiple UE-accesses from the ASS.

A User Equipment (UE) arranged to interact with a communication network wherein the UE comprises an ASS-function and wherein the UE further is arranged to communicate through an IP-based interface with an ASS. The ASS function in the UE is arranged to handle requests from the ASS to perform activation of new accesses and/or modification or deactivation of existing accesses.

A communication system comprising an Access Selection Server (ASS).

As mentioned above the ASS is arranged for communicating control messages, based on the stored information, from the ASS to the UE, thereby enabling control of multiple UE-accesses from the ASS. By the expression "control of multiple UE-accesses from the ASS" used above is meant that the ASS provides the UE with information for access selection and suggests a suitable access and that the final decision on access selection is performed by the ASS function in the UE. This definition of "control of multiple UE-accesses from the ASS" is henceforth used in the description and claims.

The UE is typically a mobile phone but can also be any types of terminals such as lap tops, smart phones or PDAs (Personal Digital Assistant). The UE can also be split into two parts as e.g. a mobile phone part and a modem part.

The PCRF, the AF, the PDN GW and the NMS are examples of communication nodes in a 3GPP (3rd Generation Partnership Project) environment interacting with the ASS. The ASS can interact with one or several of these communication nodes. However the invention is also suitable for communication networks based on and/or evolved from the 3GPP communication network or other communication networks, such as non-3GPP communication networks, where the ASS will interact with other communication nodes.

The invention provides an ASS, a corresponding method and a communication system having the advantage of providing increased access selection control from the communication network. The invention also provides a UE being equipped to interact with the ASS.

The inventive ASS will continuously be updated from the PCRF of all current active IP-CANs and corresponding active access types. The ASS is also optionally updated from the UE of e.g. available passive accesses and geographical location information for the UEs. Normally the ASS receives information concerning geographical location of the UE from the PCRF. The information about available passive accesses is communicated from the UE in case of direct access selection, described in association with FIG. 3.

The invention also has the advantage that the AF during session setup can request help from the ASS about what access and Radio Access Technology (RAT) to run this service on. The ASS has information about which Radio Access Technologies (RAT) that currently are active for the same UE. The ASS will also receive knowledge of the overall load status of the communication network from the Network Management System (NMS) and information about the most suitable mapping between services and access types accomplished by operator configurable rules. The mapping may be based on e.g. time of day, service type or location. The interaction between the AF, the ASS and the ASS function in the UE will guide the UE on what access to use for the specific service e.g. the UE may select a new access to run the service on. A Proxy-Call Session Control Function (P-CSCF) is an example of an AF.

The invention comprises a number of new or modified components and functions compared to the current Policy and Charging Control (PCC) as defined in Specification 3GPP TS 23.203 v7.3.0 release 7. Here "new" or "modified" means that the components and functions referred to are not comprised in the prior art but are specific for the invention. These new or modified components and functions comprise:

- A new, logic control function included in the ASS. The ASS may for instance be incorporated into the PCRF node or form a separate ASS-node. The ASS will have control of all accesses for the UE, with information concerning e.g. current load on the network, geographic location as cell identification, service identification specifying what type of service that is being established and current Radio Access Technology (RAT). These informations are examples of ASS access information. The ASS will communicate access selection criteria to the ASS function in the UE. The criteria may be based on e.g. communication network load, service type, active access types for the UE, location, and time of day.
- A new ASS function in the UE. The ASS function in the UE will e.g. perform activation of new accesses and/or modification or deactivation of existing accesses based on requests from the ASS to handle the ASS functionalities in the UE. This is described further in the detailed description.
- A new reference point Rx1 between the AF and the ASS designated Rx1 in FIG. 2. The interface corresponding to this new reference point Rx1 will be used during IP-session activation/modification to inform the ASS in order to enable the ASS to suggest activation/modification of accesses and guide the UE how to move IP-sessions between different accesses for the UE. This new reference point can be used for direct communication between the AF and the ASS when the ASS is a separate node. An alternative to this solution, which is described under an extended PCRF function below, is that the AF communicates via the Rx reference point, the PCRF and an Rx2 reference point to the ASS, thus making the Rx1 reference point not required. The Rx2 reference point is described below. The Rx1-reference point, being an Rx-reference point as defined in 3GPP TS 29.213 v7.0.0 and 3GPP TS 29.214 v7.0.0, is arranged between the ASS and the AF and enables the AF to communicate a request, for updating the multi-access policy rules in the UE due to AF session establishment/modification/deactivation, to the ASS. The invention is not restricted to the specifications 3GPP TS 29.213 v7.0.0 and 3GPP TS 29.214 v7.0.0 but the Rx reference point may also be defined in any future revised 3GPP specifications, i.e. any future specification being based on the above mentioned specification(s) or any new specification comprising the Rx reference point. The Rx1 reference point is further arranged to handle communication between the ASS and AF to inform the ASS of activations and modifications of IP-sessions. The information transferred is also used to identify the session and the service. Minor additions/modifications of the information available in the Rx reference point according to 3GPP TS 29.213 v7.0.0 and 3GPP TS 29.214 v7.0.0 or according to any future revised 3GPP specifications, i.e. any future specification being based on the above mentioned specification(s) or any new specification comprising the Rx reference point are within the scope of the invention as long as the functions for the Rx1 reference point as described in the description and claims are met.
- A new reference point Rx2 between the PCRF and the ASS. The interface corresponding to this new reference point is used to transfer IP-session information about the IP sessions in the PCRF e.g. active Radio Access Technology (RAT) and UE source IP address to the ASS. The new reference point is an Rx or Gx reference point or an aggregation of the Rx and Gx reference points. The Rx and Gx reference points are defined in 3GPP TS 29.213 v7.0.0, 3GPP TS 29.214 v7.0.0 and 3GPP TS 29.212 v7.0.0. The invention is not restricted to the specifications 3GPP TS 29.213 v7.0.0, 3GPP TS 29.214 v7.0.0 and 3GPP TS 29.212 v7.0.0 but the Rx and Gx reference points may also be defined in any future revised 3GPP specifications, i.e. any future specification being based on the above mentioned specification(s) or any new specification comprising the Rx and Gx reference points. Minor additions/modifications of the information available in the Rx and Gx reference points according to the specifications 3GPP TS 29.213 v7.0.0, 3GPP TS 29.214 v7.0.0 and 3GPP TS 29.212 v7.0.0 or according to any future revised 3GPP specifications, i.e. any future specification being based on the above mentioned specification(s) or any new specification comprising the Rx and Gx reference points are within the scope of the invention as long as the functions for the Rx2 reference point as described in the description and claims are met. This new reference point is designated Rx2 in FIG. 2. When the AF communicates via the Rx reference point, the PCRF and the Rx2 reference point with the ASS, thus making the Rx1 reference point not required, the Rx2 reference point has to be extended with the functionalities described for the Rx1 reference point.
- Extending the PCRF with new procedures for two new messages. In the first message the PCRF reports session information, via the reference point Rx2, to the ASS about RAT and IP address and other possible session information stored in the PCRF session data base such as e.g. geographical location of the UE, Roaming status, UE information as e.g IMEISV (International Mobile station Equipment Identity and Software) or IMEI (International Mobile station Equipment Identity) and information regarding IMSI (International Mobile Subscriber Identity). In the second message the PCRF is arranged to receive acknowledgement from the ASS of the activation, modification and deactivation of all IP-CANs from the UE. The PCRF can also optionally communicate a request, for updating the multi-access policy rules in the UE due to AF session establishment/modification/deactivation, from the AF to the ASS via the Rx2 reference point. In this case the Rx1 reference point is not required and the information exchange described for the Rx1 reference point will be communicated from the AF through the Rx reference point, the PCRF and the Rx2 reference point to the ASS. Minor additions/modifications of the information available in the Rx reference point according to 3GPP TS 29.213 v7.0.0 and 3GPP TS 29.214 v7.0.0 or according to any future revised 3GPP specifications, i.e. any future specification being based on the above mentioned specification(s) or any new specification comprising the Rx reference point are within the scope of the invention as long as the functions for the communication between the AF and the PCRF as described in the description and claims are met.

A new interface between the ASS function in the UE and the ASS. The interface is an IP-based interface between the ASS function in the UE and the ASS. The interface is used to transport multi-access policy rules from the ASS to the ASS function in the UE and optionally information from the ASS function in the UE to the ASS regarding e.g. available passive accesses and geographical location of the UE. The advantage by using this IP-based interface is that a generic non-access specific protocol can be used.

Here "aggregation" of the Rx and Gx reference points refers to that either all the information available in both the Rx and Gx reference points are available in the new reference point Rx2 or that a part or parts of the information available at the Rx reference point and a part or parts of the information available at the Gx reference point are available at the new reference point Rx2.

The main advantages with the invention can be summarized as follows:

The invention will enable multi-access control from the communication network. The communication network will have control of all accesses activated for each UE. The total control of all accesses for one UE will thus be available at one location in the communication network. The communication network will be able to suggest the UE to activate new accesses or move sessions to another active access.

The communication network can use several criteria to control the access selection e.g.
Load of the communication network
Type of service
Location
Time of day.

The invention may build from the existing Policy and Charging Control (PCC) solution in 3GPP as defined in 3GPP TS 23.203 v7.3.0, release 7 or any future revised 3GPP specifications, i.e. any future specification being based on the above mentioned specification or any new specification comprising the PCC.

This enables a smooth introduction of the invention and avoids unwanted interaction problems with the current PCC implementations and overlapping functionality in the PCC.

Minor additions/modifications of the PCC according to the specification 3GPP TS 23.203 v7.3.0, release 7 or according to any future revised 3GPP specification, i.e. any future specification being based on the above mentioned specification or any new specification comprising the PCC are within the scope of the invention as long as the functions of the invention as described in the description and claims are met.

The invention is not restricted to 3GPP specifications, but also valid for specifications being identical to or similar to 3GPP. Examples of such specifications are $3^{rd}$ Generation Partnership Project 2 (3GPP2) and Telecoms & Internet converged Services and Protocols for Advanced Networks (Tispan).

Further advantages are achieved by implementing one or several of the features of the dependent claims which will be explained below.

BRIEF DESCRIPTION OF THE DRAWINGS

FIG. 3 Illustrates examples of Access selection criteria.

DETAILED DESCRIPTION

The invention will now be described in detail with reference to the drawings and some examples of implementations of the invention.

Figure 1:
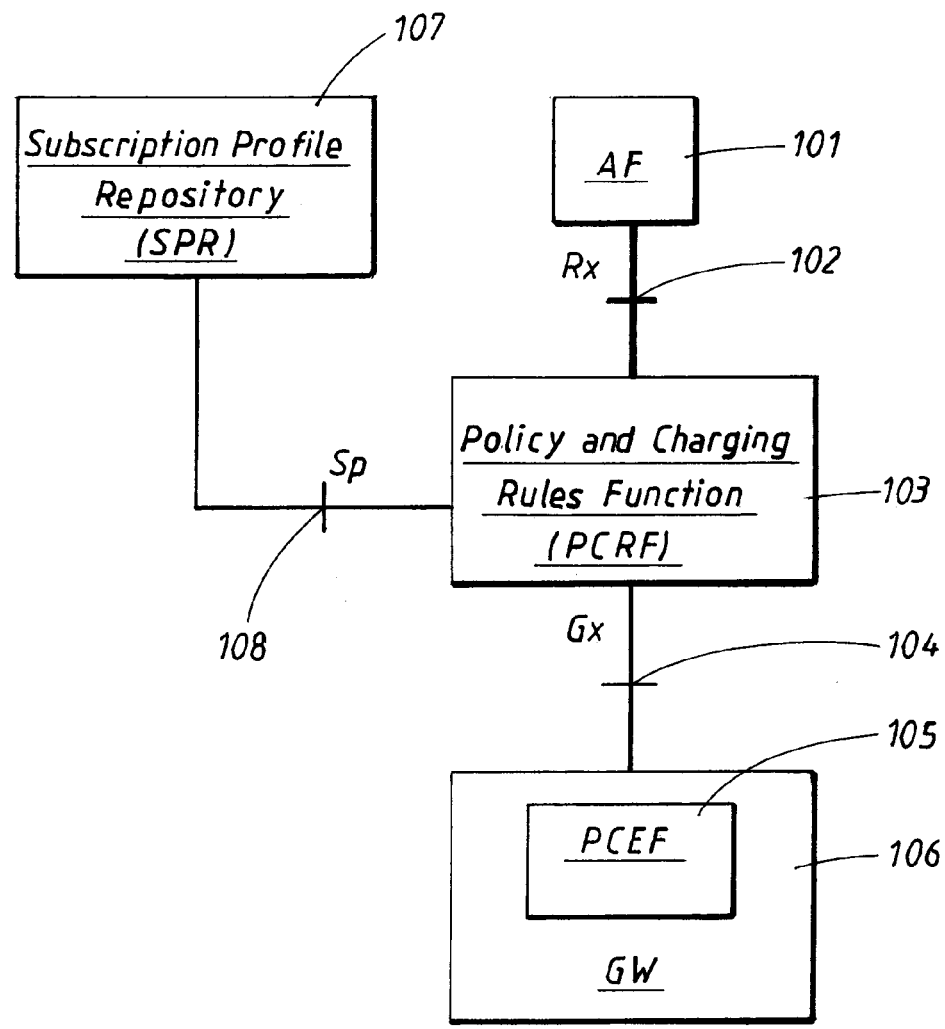
FIG. 1 Schematically shows Policy and Charging Control (PCC) according to prior art.

FIG. 1 has already been described in relation to Background above.

Figure 2:
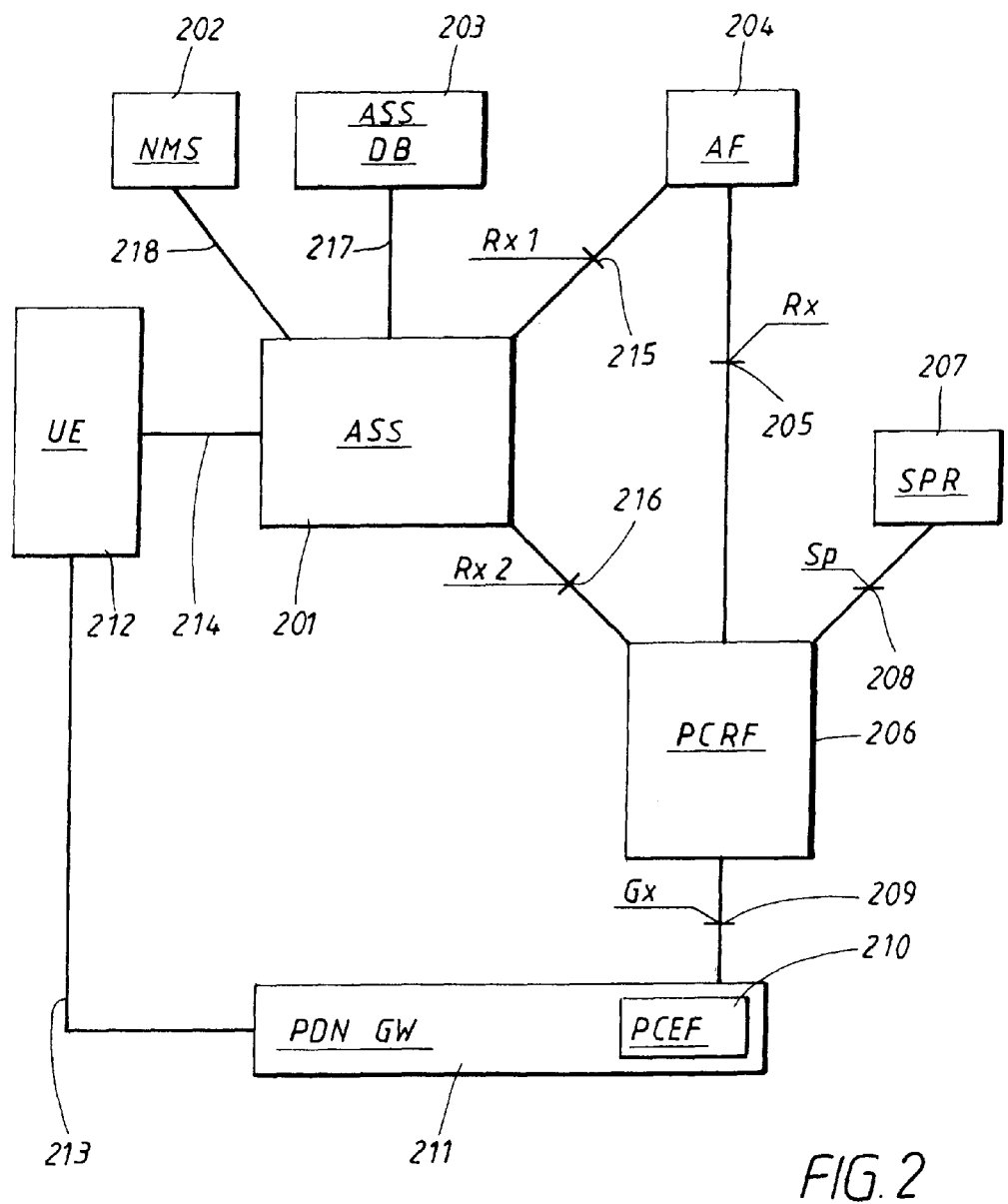
FIG. 2 Schematically shows a block diagram of interactions between the Access Selection Server (ASS) and other functions in a 3GPP environment.

FIG. 2 schematically shows a block diagram of interactions between inventive Access Selection Server (ASS) 201 and other functions in a 3GPP environment. This is an embodiment where the ASS is adapted for location in a 3GPP network. It can also be adapted for location in non-3GPP communication networks. The ASS collects information about the load status of the communication network from a Network Management System (NMS) 202. An ASS subscriber DataBase (ASS DB) 203 in a 3GPP environment informs the ASS of Multi Access Control Policies such as e.g.:

Subscription related policies
Roaming/Access Agreements
User Preferences

Figure 4B:
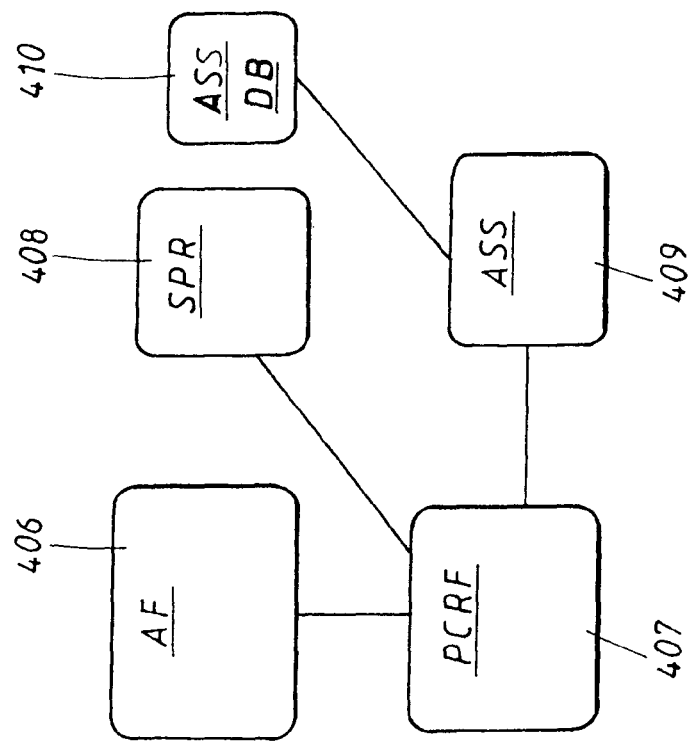
FIG. 4 Schematically shows some embodiments for relations between the ASS and the PCC.

The information between the ASS DB and the ASS is transferred through an interface 217 when the ASS and the ASS DB are separate nodes as shown e.g. in FIG. 4b. When the ASS and the ASS DB are deployed in other configurations as described in association with FIG. 4, the interface 217 can be used, or existing interfaces between nodes or node-internal interfaces can be adapted for including communication between the ASS and the ASS DB. The interface 217 can e.g. be a Lightweight Directory Access Protocol (LDAP).

The information stored in storing means of the ASS DB is normally provided by the communication network operator but part of the information can be modified from the subscriber within operator configured limits. The modification can e.g. be made via a Web GUI (Graphical User Interface). The ASS DB can, as is the case also for the ASS, be adapted for 3GPP communication networks or non-3GPP communication networks. For non-3GPP communication networks the ASS DB communicates corresponding information to the ASS as described for the 3GPP communication network above.

The subscription related policies in the ASS DB can e.g. be divided in Premium and Basic users with multi access policies like different access types, classes of Quality of Service (QoS) or Best effort. Best effort is the lowest of all QoS traffic classes. If the guaranteed QoS cannot be delivered, the bearer network delivers the QoS which can also be called Best effort QoS.

An Application Function (AF) 204 communicates with a Policy and Charging Rules Function (PCRF) 206 via an Rx reference point 205. An SPR 207 communicates with the PCRF via a reference point Sp 208 and the PCRF communicates with a PCEF 210 via a Gx reference point 209. All parts 204-210 are part of the PCC architecture and are explained in association with FIG. 1.

One example of an AF function is a P-CSCF (Proxy—Call Session Control Function). In the case the IP-session is an IMS-session (Internet protocol Multimedia Subsystem) the P-CSCF is part of the IMS core.

The PCEF 210 functional entity is located at a Packet Data Network Gateway (PDN GW) 211 (e.g. Gateway GPRS Support Node, GGSN, in the GPRS case). It provides control over the user plane traffic handling at the PDN GW and its QoS, and provides service data flow detection and counting as well as online and offline charging interactions. For a service data flow that is under policy control the PCEF shall allow the service data flow to pass through the PDN GW 211 if and only if the corresponding gate is open.

The PDN GW is a general terminology for a gateway between a Packet Data Network (PDN) and any access specific network as e.g. a 3GPP or a non-3GPP communication network. Typical functionality of a PDN GW includes:

Policy enforcement
Per-user based packet filtering (by e.g. deep packet inspection)
Charging support
Lawful Interception
UE IP address allocation
Packet screening The PDN GW may for some access technologies or standardization bodies be integrated with other core network nodes. In 3GPP the PDN GW functionality is located in the GGSN node and for 3GPP System Architecture Evolution (SAE) the PDN GW functionality is a unique node named PDN GW.

The UE 212 is connected via one or several IP-CANs 213, such as a network based on Radio Access Technology (RAT), to the PDN GW 211 comprising the PCEF 210. The PDN GW 211 is also connected to the PCRF via reference point Gx 209. The UE can also communicate with more than one PDN GW each PDN GW having one or several IP-CAN connections with the UE. All these IP-CANs from the UE are henceforth called UE IP-CANs. For clarity reasons FIG. 2 shows just one IP-CAN 213 and one PDN GW 211.

The UE, 212, arranged to interact with the communication network, is connected to the ASS through an IP-based interface 214. The UE will include an ASS function comprising multi-access policy rules. These multi-access policy rules can be of either a direct selection type or of a selection type using a preference list as described in association with FIG. 3. The ASS function in the UE will, based on requests from the ASS, handle the ASS functionalities in the UE as e.g. perform activation of new accesses and/or modification or deactivation of existing accesses according to the multi-access policy rules. The IP connection between the ASS function in the UE and the ASS, through the IP-based interface 214, will be established at activation of the default IP-CAN. This IP connection is used to communicate access selection information between the ASS function in the UE and the ASS. The ASS function in the UE can e.g. receive data concerning selection of Radio Access Technology. Other examples of such information communication is transport of multi-access policy rules from the ASS to the ASS function in the UE and optionally information from the ASS function in the UE to the ASS regarding e.g. available passive accesses and geographical location of the UE. Normally the ASS receives information concerning geographical location of the UE from the PCRF. The information about available passive accesses is communicated from the ASS function in the UE in case of direct access selection, described in association with FIG. 3.

The UE will inform the ASS from the ASS function in the UE, via the IP-based interface, 214, about access information, including IP session information, e.g. RAT type, on all active and passive accesses. A passive access is an access possible for the UE to activate but that is currently not activated. Each access comprises one IP-session.

An alternative embodiment is to use an access specific interface instead of the IP-based interface 214 for communication between the UE and ASS. An example of such an interface is GTP (GPRS Tunneling Protocol) for 3GPP accesses. The information in the GTP protocol is transferred from the UE via the PDN GW 211, the reference point Gx 209, the PCRF 206 and an Rx2 reference point 216 to the ASS 201.

The Network Management System (NMS) 202 is a combination of hardware and software used to monitor and administer a network. The ASS receives information about load status for different Radio Access Technologies within the communication network from the NMS through a management interface 218. This interface can e.g. be a Simple Network Management Protocol (SNMP) defined by the Internet Engineering Task Force (IETF). The SNMP can e.g. initiate an alarm signal to the ASS when the communication network load exceeds a certain maximum-level and a clear signal when the load is below a certain minimum-level. This is performed per access type and geographical area.

The invention comprises two new reference points Rx1, 215, and Rx2, 216. Rx1 is a new reference point between the AF and the ASS. The Rx1 reference point is an option that can be used in the case the ASS is a separate node. The interface corresponding to this new reference point Rx1 will be used during IP-session activation/modification to inform the ASS in order to enable the ASS to suggest activation/ modification of accesses and guide the UE how to move IP-sessions between different accesses for the UE. This new reference point can be used for direct communication between the AF and the ASS when the ASS is a separate node. An alternative to this solution, which is described under an extended PCRF function below, is that the AF communicates via the Rx reference point, the PCRF and the Rx2 reference point to the ASS, thus making the Rx1 reference point not required.

The Rx2 reference point is described below. The Rx1-reference point, being an Rx-reference point as defined in 3GPP TS 29.213 v7.0.0. and 3GPP TS 29.214 v7.0.0, is arranged between the ASS and the AF and enables the AF to communicate a request, for updating the multi-access policy rules in the UE due to AF session establishment/modification/deactivation, to the ASS. The invention is not restricted to the specifications 3GPP TS 29.213 v7.0.0 and 3GPP TS 29.214 v7.0.0 but the Rx reference point may also be defined in any future revised 3GPP specifications, i.e. any future specification being based on the above mentioned specification(s) or any new specification comprising the Rx reference point. The Rx1 reference point is further arranged to handle communication between the ASS and AF to inform the ASS of activations and modifications of IP-sessions. The information transferred is also used to identify the session and the service. Minor additions/modifications of the information available in the Rx reference point according to 3GPP TS 29.213 v7.0.0 and 3GPP TS 29.214 v7.0.0 or according to any future revised 3GPP specifications, i.e. any future specification being based on the above mentioned specification(s) or any new specification comprising the Rx reference point are within the scope of the invention as long as the functions for the Rx1 reference point as described in the description and claims are met.

Rx2 is a new reference point between the PCRF and the ASS arranged to handle communication between the ASS and the PCRF. The interface corresponding to this new reference point is used to transfer IP-session information about the IP sessions in the PCRF e.g. active Radio Access Technology (RAT) and UE source IP address to the ASS. The new reference point is an Rx or Gx reference point or an aggregation of the Rx and Gx reference points, these reference points being defined in 3GPP TS 29.213 v7.0.0, 3GPP TS 29.214 v7.0.0 and 3GPP TS 29.212 v7.0.0. The invention is not restricted to the specifications 3GPP TS 29.213 v7.0.0, 3GPP TS 29.214 v7.0.0 and 3GPP TS 29.212 v7.0.0 but the Rx and Gx reference points may also be defined in any future revised 3GPP specifications, i.e. any future specification being based on the above mentioned specification(s) or any new specification comprising the Rx and Gx reference points. Minor additions/modifications of the information available in the Rx and Gx reference points according to the specifications 3GPP TS 29.213 v7.0.0, 3GPP TS 29.214 v7.0.0 and 3GPP TS 29.212 v7.0.0 or according to any future revised 3GPP specifications, i.e. any future specification being based on the above mentioned specification(s) or any new specification comprising the Rx and Gx reference points are within the scope of the invention as long as the functions for the Rx2 reference point as described in the description and claims are met. This new reference point is designated Rx2 in FIG. 2. When the AF communicates via the Rx reference point, the PCRF and the Rx2 reference point with the ASS, thus making the Rx1 reference point not required, the Rx2 reference point has to be extended with the functionalities described for the Rx1 reference point.

The PCRF 206 is extended with new procedures for two new messages. In the first message the PCRF reports session information, via the reference point Rx2, to the ASS about RAT and IP address and other possible session information stored in the PCRF session data base such as e.g. geographical location of the UE, Roaming status, UE information as e.g IMEISV (International Mobile station Equipment Identity and Software) or IMEI (International Mobile station Equipment Identity) and information regarding IMSI (International Mobile Subscriber Identity). In the second message the PCRF is arranged to receive acknowledgement from the ASS of the activation, modification and deactivation of all the UE IP-CANs 213. The PCRF can also optionally communicate a request, for updating the multi-access policy rules in the UE due to AF session establishment/modification/deactivation, from the AF to the ASS via the Rx2 reference point. In this case the Rx1 reference point is not required and the information exchange described for the Rx1 reference point will be communicated from the AF through the Rx reference point, the PCRF and the Rx2 reference point to the ASS. Minor additions/modifications of the information available in the Rx reference point according to 3GPP TS 29.213 v7.0.0 and 3GPP TS 29.214 v7.0.0 or according to any future revised 3GPP specifications, i.e. any future specification being based on the above mentioned specification(s) or any new specification comprising the Rx reference point are within the scope of the invention as long as the functions for the communication between the AF and the PCRF as described in the description and claims are met.

When the Rx1 reference point is used between the AF or P-CSCF and the ASS, the AF or P-CSCF has to be modified to communicate a request, for updating the multi-access policy rules in the UE due to AF session establishment/modification/deactivation, from the AF or P-CSCF to the ASS via the Rx1 reference point. The request will contain information about the service type e.g. an ICSI (IMS Communication Service ID) and/or IARI (IMS Application Reference Identifier) from SIP (Session Initiation Protocol) INVITE and information from a SDP (Session Description Protocol) in order to identify the service session. This request will be described more in association with FIG. 8.

The PCRF 206, the AF 204, the PDN GW 211 and the NMS 202 are examples of communication nodes in a 3GPP (3$^{rd}$ generation Partnership Project) communication network interacting with the ASS. However the invention is also suitable for communication networks based on and/or evolved from the 3GPP communication network or other communication networks, such as non-3GPP communication networks, where the ASS will interact with other communication nodes.

The ASS will use the information received as described above for a new logic control function. The ASS may for instance be incorporated into the PCRF node or form a separate ASS node. The ASS will have control of all accesses for the UE and have all ASS access information available. The ASS will communicate control messages including e.g. access selection criteria to the ASS function in the UE based on the information stored in the ASS storing means. The criteria may be based on communication network load, service type, active access types for the UE, location and time of day.

The ASS and the ASS DB will comprise any type of conventional storing means well known to the skilled person.

The ASS may be integrated with both the PCRF and the AF (e.g. P-CSCF) into one logical node. Further integration examples are described in association with FIG. 4.

When the ASS and the PCRF are integrated in the same node the Rx2 interface or a node-internal interface can be used for communication between the PCRF and the ASS.

There is typically only one ASS per Public Land Mobile Network (PLMN). If there are more than one ASS, the ASS can be addressed with a user identification as e.g. International Mobile Subscriber Identity (IMSI).

FIG. 3 shows how the ASS 301 will be able to communicate either a direct access selection criterion 303 or an access selection criterion defined in a preference list 304 to the UE 302 via the IP-based interface 305. In the example of FIG. 3 the direct access selection criterion is that for the service Voice, the RAT type WLAN is to be used. If the preference list 304 is used, the example of FIG. 3 shows that if the service is Voice and the location Home, WLAN (Wireless Local Area Network) shall have priority 1 and UTRAN (Universal Terrestial Radio Access Network) priority 2. If however the location is PLMN, UTRAN receives first priority and WLAN second. Other parameters can also be included in the preference list as e.g. load, time of the day e.t.c. The direct selection is easy to handle in the UE but requires more signalling. The preference list selection requires more sophisticated processing in the UE but gives the advantage of easier signalling procedures. Both solutions are possible within the scope of the invention. One embodiment of the invention can have direct selection and another embodiment the preference list embodiment. A further possibility is that a third embodiment has both selection alternatives available and a choice of which type to use is made by e.g. a network operator. The access selection criteria are included in the ASS software being arranged to be communicated to the UE through the IP based interface 305, thus establishing a control of the UE from the ASS. The ASS function in the UE must be equipped for the selection embodiment used. In the case when the direct access selection criterion is used information of available passive accesses is communicated to the ASS from the ASS function in the UE.

Figure 4A:
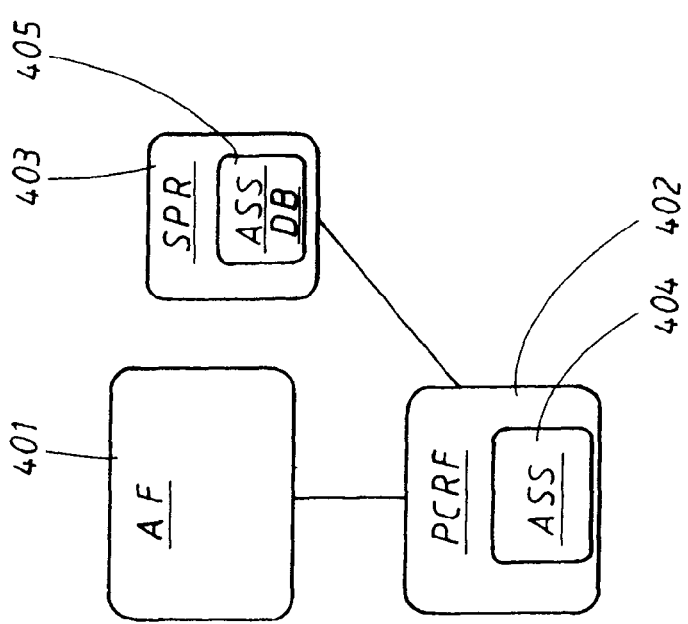

FIG. 4 shows some alternatives for ASS relations with the PCC. In FIG. 4a the AF 401 and a SPR 403 are connected to a PCRF 402. The ASS 404 is integrated with the PCRF 402 and the ASS DB 405 is integrated with the SPR 403. An advantage with this solution is that no additional node is introduced. The PCRF 402 and the SPR 403 have to be adapted for the deployment. The integration means that the ASS/PCRF is integrated into one logical node and the ASS DB/SPR is integrated into another logical node. In FIG. 4b, which is according to the FIG. 2 architecture, the AF 406 and the SPR 408 are connected to the PCRF 407. The ASS DB 410 is connected to the ASS 409 and the ASS is connected to the PCRF 407. An advantage with this solution is that it has minimal impact on the PCRF and the SPR. However an additional node is introduced.

Other possibilities for integration embodiments of the invention not shown in FIG. 4 are e.g. that the ASS/ASS DB or ASS/ASS DB/PCRF or ASS/PCRF/SPR or ASS/PCRF/SPR/ASS DB are integrated into one logical node. Another example of integration is that the ASS, the ASS DB and the SPR are integrated in one PCRF A and that the ASS integrated in the PCRF A also communicates with a geographically separated PCRF B. The PCRF-A can also communicate with several, from the PCRF-A, geographically separated PCRFs. The examples with several PCRFs to one ASS are applicable in the case when one UE has IP-CANs connected to several PCRFs. In all the integration examples the AF, as e.g. the P-CSCF, can also be included in the integration. Other integration combinations of the ASS with communication nodes are also possible within the scope of the invention.

As mentioned in association with the description of FIG. 2 the P-CSCF is one example of an AF function. The P-CSCF is normally not affected by the introduction of the ASS and communicates through the Rx reference point with the PCRF. This is the situation if the ASS is integrated into one logical node with the PCRF or with the PCRF and further nodes, such as the AF, and normally also when the ASS and PCRF are separate logical nodes. Minor additions/modifications of the information available in the Rx reference point according to 3GPP TS 29.213 v7.0.0 and 3GPP TS 29.214 v7.0.0 or according to any future revised 3GPP specifications, i.e. any future specification being based on the above mentioned specification(s) or any new specification comprising the Rx reference point are within the scope of the invention as long as the functions for the communication between the P-CSCF and the PCRF as described in the description and claims are met. When the ASS is a separate logical node there is however the additional possibility that the P-CSCF is modified to communicate a request to the ASS through the new reference point Rx1 for activation of access selection.

The ASS function in the UE will e.g. perform activation of new accesses and/or modification or deactivation of existing accesses based on requests from the ASS to handle the ASS functionalities in the UE. The ASS function in the UE will also be adapted for one or more of:
- informing the ASS about available passive accesses for the UE and/or geographical location information for the UE.
- receiving data concerning selection of a Radio Access Technology
- communicating a request for an IP-CAN establishment
- initiating for SIP invite/reinvite as will be described in association with FIGS. 7-9.

The ASS function in the UE can e.g. be arranged as part of the UE hardware/software or as a separate hardware/software module by any conventional means well known to the skilled person. The ASS function in the UE also communicates with other resources in the UE as e.g, an IMS function including a SIP client software module and/or access establishment resources.

The invention will now be further described from a logical and deployment view and with use cases.

Figure 5:
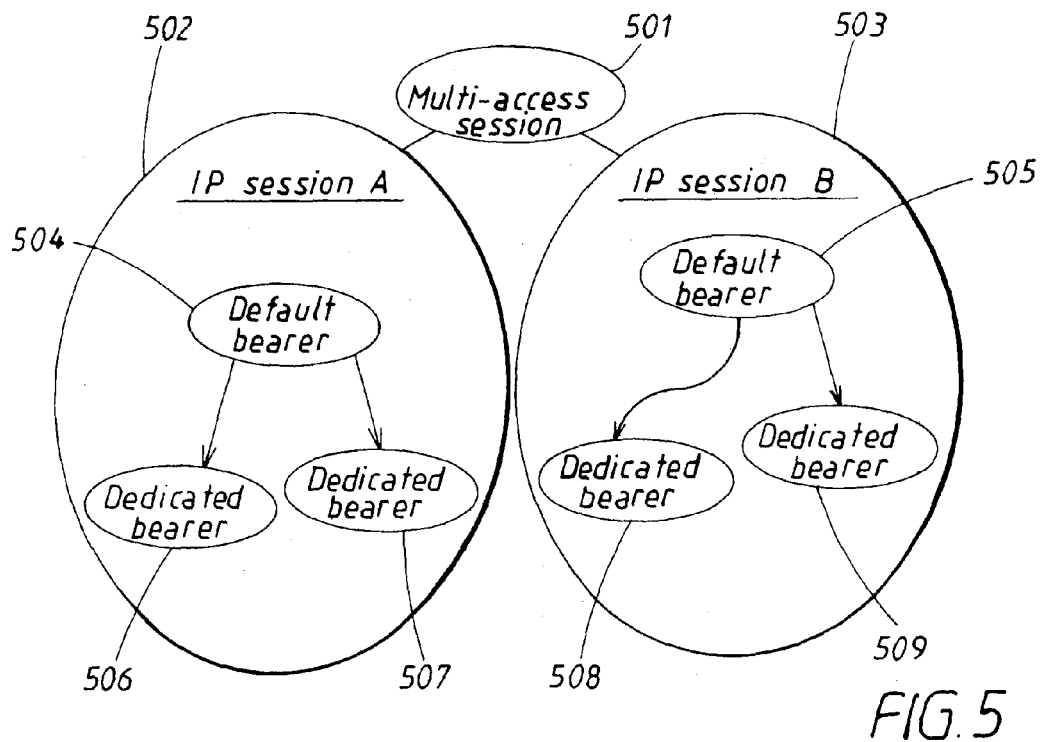
FIG. 5 Schematically shows a logical view of multiple IP sessions controlled by one multi-access session.

FIG. 5 shows an example where an UE A, has one multi-access session 501 controlling two IP sessions 502 and 503 i.e. one for access A and one for access B. The IP sessions are equal to the prior art IP session available in the PCRF. The IP session contains information about e.g. the current IP-CAN concerning Radio Access Technology (RAT) and source address of the UE. A purpose of the invention is to create a new multi-access session with information about all currently active accesses for one UE, i.e. in this case IP sessions A and B for the UE A. When the IP session is started default bearers 504 and 505, within the access IP-CAN, are selected. During the session, one or several dedicated bearers, 506-509 can be added.

Figure 6:
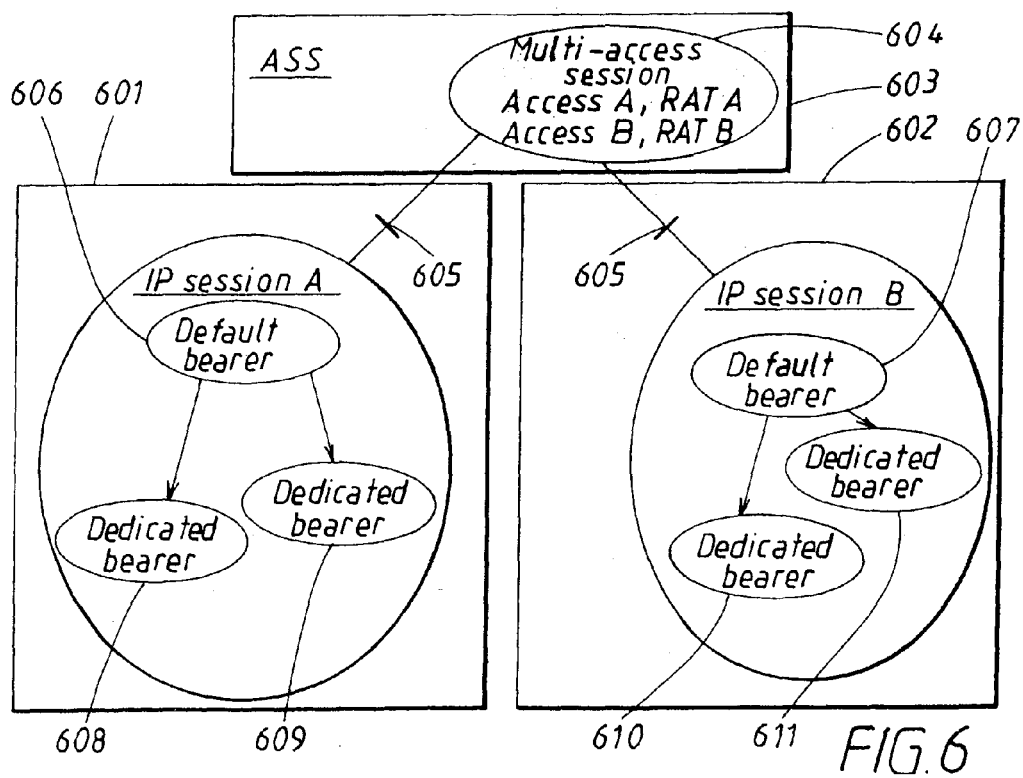
FIG. 6 Schematically shows a deployment view of multiple IP sessions for one User Equipment (UE) controlled by one multi-access session.

FIG. 6 shows a possible deployment view with PCRF A and B, 601 and 602, based on the existing PCRF nodes. The UE A has two IP-CAN accesses A and B, access A connected to the PCRF A, 601, and access B connected to the PCRF B, 602. The ASS, 603, has a multi-access session 604 for the UE A. The multi-access session receives information from the PCRF A and B about the IP sessions e.g. RAT type and UE source address, thus controlling the two IP sessions. The new reference point Rx2, 605, is located between the PCRF and the ASS as described above. When the IP session is started default bearers 606 and 607, within the access IP-CAN, are selected. During the session, one or several dedicated bearers, 608-611 can be added. In the embodiment of FIG. 6 the two accesses are in different PCRFs. In other embodiments the two accesses can be in the same PCRF.

At IP-CAN establishment between the UE and the PDN GW, e.g. when the UE is turned on, or, at modification of the IP-CAN, the ASS continuously gets updated with the current access types that are active for the UE. This is illustrated in the signalling flow diagram in FIG. 7 comprising the UE 701, a GGSN A 702, a GGSN B 703, a PCRF A 704, a PCRF B 705 and the ASS 706. The use case shows how the ASS 706 continuously gets ASS access information. In this case there are two radio accesses simultaneously (A and B) for the same UE 701. The use case shows a GPRS application, thus the PDN GW in this case is a Gateway GPRS Support Node (GGSN). The different messages 1-10 in the establishment of two IP-CANs comprise the following activities.

1. A request for IP-CAN establishment is sent to a GGSN A 702 from the UE and the ASS function in the UE is informed of the new access.
2. A request for PCC rules is sent from the GGSN A to a PCRF A 704 via the Gx reference point using message CCR (Create Charging Rule), this message being defined in 3GPP TS 29.212 v7.0.0 chapter 5.6.2 and future revisions of this specification or future specifications being based on this specification.
3. The PCRF A reports session information, via the reference point Rx2, to the ASS 706 about RAT and IP address and other possible session information stored in the PCRF A session data base such as e.g. geographical location of the UE, Roaming status, UE information as e.g IMEISV (International Mobile station Equipment Identity and Software) or IMEI (International Mobile station Equipment Identity) and information regarding IMSI (International Mobile Subscriber Identity). The ASS downloads Multi Access Control Policies for the subscriber from the ASS DB and checks if the request is valid.
4. The ASS acknowledges the starting up of the IP-CAN to the PCRF A.
5. The PCRF A downloads PCC rules to the GGSN A and the GGSN A acknowledges the IP-CAN establishment to the UE.

Messages 1-5 show how the ASS receives ASS access information about e.g. the currently used RAT type for the UE and the UE source IP address. Messages 3 and 4 are not comprised in prior art but are specific for the invention. Hence message 3 and 4 are new messages but the other messages exist in the current PCC standard, as defined in 3GPP TS 23.203 v7.3.0.

Messages 6-10 shows the same procedure for access B.

Figure 8:
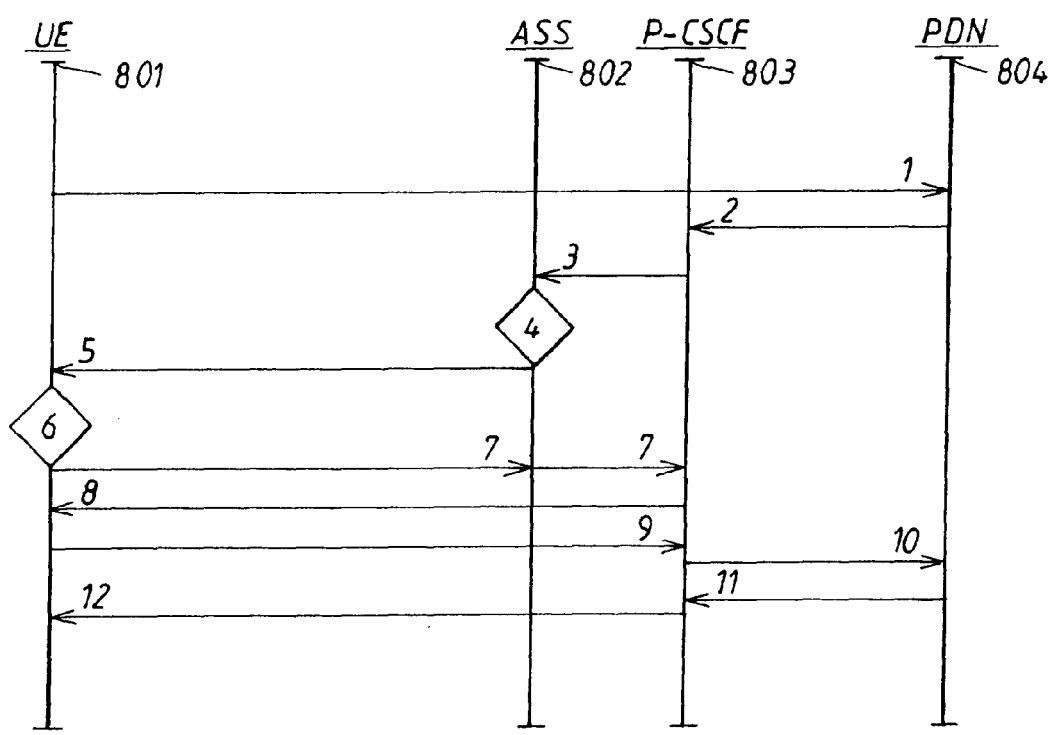
FIG. 8 Schematically shows a signalling diagram for change of access due to AF session establishment with accesses A and B active.
Figure 9:
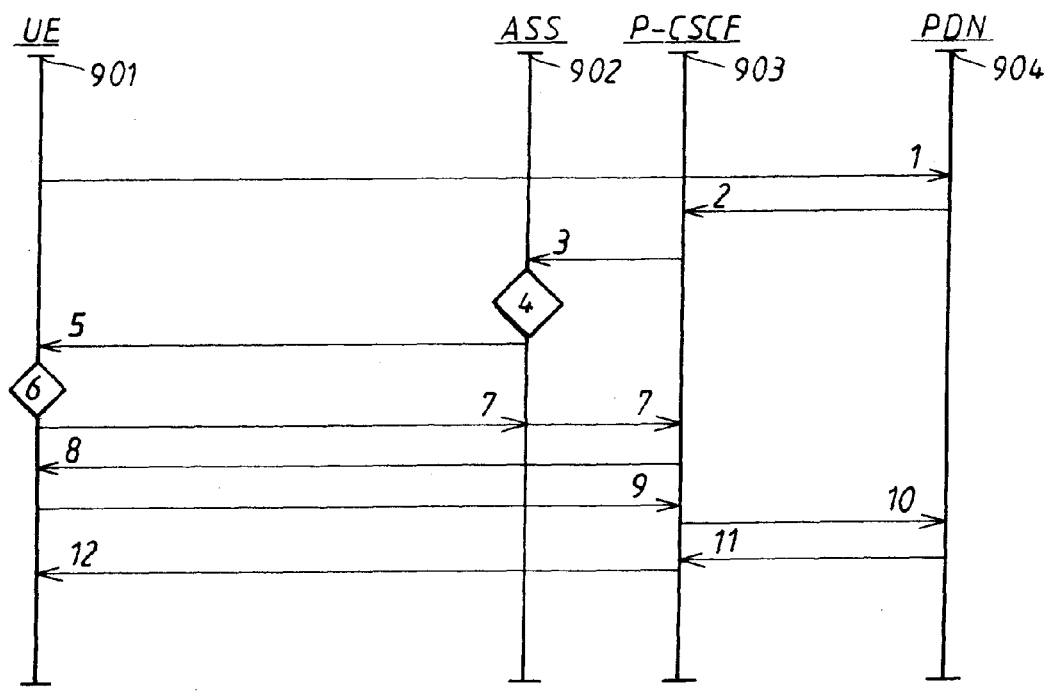
FIG. 9 Schematically shows a signalling diagram for change of access due to AF session establishment with access B active and access A activated based on request from the network.

The following two use cases, illustrated in FIGS. 8 and 9, show how an access can be changed during session set up. These two use cases show how the UE starts an IP session setup on an access B, here exemplified with an IMS (IP Multimedia Subsystem) session, and during session setup, based on info from the ASS, moves the session to another RAT type (Access A). The IMS session is moved to an access A. The interaction between the ASS function in the UE, the P-CSCF and the ASS is described in FIG. 8. The IMS session can e.g. be Multi Media Telephony, including Voice over IP (VoIP), or IP-TV.

Two alternatives are shown: One when the new access is already active and another when the UE, based on input from the network, activates a new, not active, RAT type.

The signalling flow diagram of FIG. 8 comprises the UE 801, the ASS 802, the P-CSCF 803 and a PDN 804. FIG. 8 illustrates the situation when both accesses A and B are active i.e. two IP-sessions are established. SIP signalling (Session Initiation Protocol), has started on access B. SIP is an IETF standard (Internet Engineering Task Force) used by 3GPP as a signalling protocol and permanent element of the IMS architecture. The procedure is described in activity steps 1-12 as follows:

1. A SIP INVITE message is initiated from the ASS function in the UE 801 and sent to the other end of the end-to-end SIP session via the PDN 804 on the default bearer for access B. This signalling process uses an offer/answer model with the Session Description Protocol (SDP) as defined in IETF RFC 3264 and the IMS Communication Service Identifier (ICSI) and/or IMS Application Reference Identifier (IARI) as defined in 3GPP TS 24.229 chapter 7.2A.8 and 7.2A.9 and future revisions of these two specification or future specifications being based on these two specification. The ICSI and/or IARI is used to identify the type of service
2. A SIP 200 OK message is sent from the other end of the end-to-end SIP session via the PDN to the P-CSCF 803.
3. After the SDP offer/answer procedure, the P-CSCF will communicate a request, for updating the multi-access policy rules in the UE due to AF session establishment/modification/deactivation to the ASS 802 via the reference point Rx1. The request will contain information about the service type e.g. the ICSI and/or IARI from SIP INVITE and information from the SDP in order to identify the service session.
4. The ASS will analyze what is the best access type based on the SDP/ICSI/IARI parameters, including one or several of these parameters, currently active access types for this UE, location and network load. The ASS has information about current access types for this UE. The ASS decides to move the SIP session to access type A.
5. An ASS update message is sent to the ASS function in the UE with a request that this IMS session shall be moved to the access A.
6. The ASS function in the UE informs an IMS function in the UE that media for this service shall be sent on the access A. The IMS function in the UE handles e.g. SIP signalling and is interacting with the ASS function in the UE.
7. A successful response message is sent to the P-CSCF via the ASS and the Rx1 reference point.
8. A SIP 200 OK message is forwarded to the UE from the P-CSCF.
9. The IMS function in the UE will, based on info from the ASS function in the UE, move the session to the access A by sending a SIP REINVITE message to the P-CSCF with the SDP for the access A in order to confirm that the change to the access A has been performed.
10. A SIP REINVITE message is forwarded to the other end of the end-to-end session via the PDN.
11,12. A SIP 200 OK message is received from the other end of the end-to-end session via the PDN and forwarded to the P-CSCF and the UE.

Media transfer can now start on the new access A.

The signalling flow diagram of FIG. 9 comprises the UE 901, the ASS 902, the P-CSCF 903 and the PDN 904. FIG.

9 illustrates the situation when an access B is active, i.e. one IP-session is established. SIP signalling has started on the access B. The procedure is described in activity steps 1-12 as follows.

1. A SIP INVITE message is initiated from the ASS function in the UE 901 to the other end of the end-to-end SIP session via the PDN 904 on the default bearer for the access B. This signalling process uses an offer/answer model with the Session Description Protocol (SDP) as defined in IETF RFC 3264 and the IMS Communication Service Identifier (ICSI) and/or IMS Application Reference Identifier (IARI) as defined in 3GPP TS 24.229 chapter 7.2A.8 and 7.2A.9 and future revisions of these two specification or future specifications being based on these two specification. The ICSI and/or IARI is used to identify the type of service.
2. A SIP 200 OK message is sent from the other end of the end-to-end SIP session via the PDN to the P-CSCF 903.
3. After the SDP offer/answer procedure, the P-CSCF will communicate a request, for updating the multi-access policy rules in the UE due to AF session establishment/modification/deactivation to the ASS 802 via the reference point Rx1. The request will contain information about the service type e.g. the ICSI and/or IARI from SIP INVITE and information from the SDP in order to identify the service session.
4 & 5. The ASS will analyze what is the best access type based on the SDP/ICSI/IARI parameters, including one or several of these parameters, currently active access types for this UE, location and network load. The ASS has information about current access types for this UE. The ASS decides that this session, if possible, should be handled on a RAT type A. There are two options how this can be communicated between the ASS and the ASS function in the UE; the direct access selection or the preference list selection as described in association with FIG. 3. A prerequisite for direct selection is that the ASS function in the UE has informed the ASS of which accesses being available, as described above.
6. The ASS function in the UE activates the new access.
7. A successful response message is sent to the P-CSCF via the ASS and the Rx1 reference point.
8. A SIP message 200 OK is forwarded to the UE from the P-CSCF.
9. The IMS function in the UE will, based on info from the ASS function in the UE, move the session to the access A by sending a SIP REINVITE message to the P-CSCF with the SDP for the access A in order to confirm that the change to the access A has been performed.
10. A SIP REINVITE message is forwarded to the other end of the end-to-end SIP session via the PDN.
11,12. A SIP 200 OK message is received from the other end of the end-to-end session via the PDN and forwarded to the P-CSCF and the UE.

Media transfer can now start on the new access A.

The two examples in FIGS. 8 and 9 illustrate the principle of the invention with an IMS signalling procedure in its simplest form using the Rx1 reference point. Other variations of the signalling procedures are of course possible within the scope of the invention e.g. when the communication nodes are integrated in other combinations or when the Rx1 reference point is not used, but information instead is communicated from the P-CSCF via the Rx reference point, the PCRF and the Rx2 reference point to the ASS. The different integration combinations of nodes and the ASS and the Rx2 reference point is described above.

Figure 7:
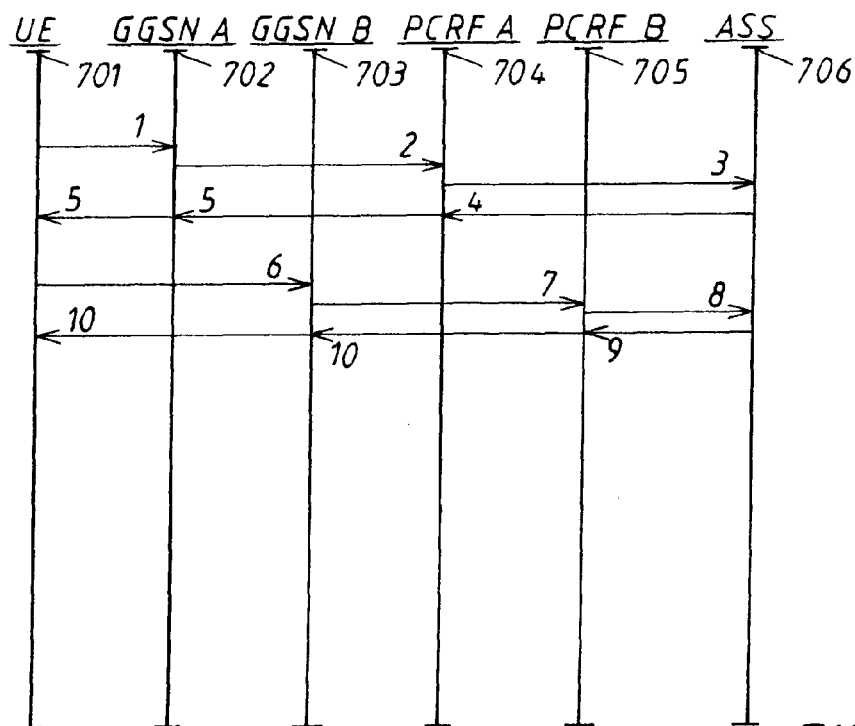
FIG. 7 Schematically shows a signalling diagram for an IP-CAN establishment.

FIG. 7 shows one example of an IP-CAN establishment according to one embodiment of the invention. Within the scope of the invention there can also be variations of the IP-CAN establishment, e.g. when the PCRF A and the PCRF B are in the same node.

The ASS software comprises rules and algorithms for signalling diagrams and signalling procedures. The ASS software is arranged to perform handling of a single access or multiple accesses in parallel and guiding the UE in activating, modifying or changing an access in order to request the correct Radio Access Technology (RAT).

Figure 10:
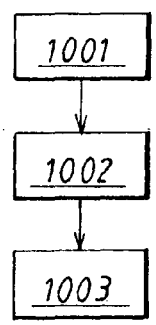
FIG. 10 Schematically illustrates the method of the invention.

FIG. 10 schematically illustrates a method for the ASS as described above. The method advantageously gives the ASS the possibility to allow each UE to have multiple accesses to at least one Packet Data Network Gateway (PDN GW) being part of the communication network, each access comprising one IP-session. This is achieved by the method being performed as described in boxes 1001-1003.

Box 1001: The ASS collects information through interactions with the communication nodes and the UE.

Box 1002: The ASS stores information of all accesses for each UE in the communication network and information of overall load status of the communication network in the storing means.

Box 1003: The ASS sends control messages, based on the stored information, from the ASS to the UE, thereby enabling control of multiple UE-accesses from the ASS.

This is one embodiment of performing the method according to the invention. Variations of this embodiment, as e.g. different orders of performing the steps, are possible within the scope of the appended claims.

The invention also includes a communication system comprising the ASS. The communication system can also include a Subscription Profile Repository (SPR) connected to the PCRF through a reference point Sp, 208.

Future revisions of specifications and standards mentioned in the description and claims as well as future specifications and standards based on these specification and standards are within the scope of the invention.

The invention is not limited to the embodiments above, but may vary freely within the scope of the appended claims.

The invention claimed is:

1. An Access Selection Server (ASS), comprising:
    a processor and memory, wherein said memory contains instructions executable by said processor, the ASS being adapted for location in a communication network according to 3$^{rd}$ Generation Partnership Project (3GPP) having at least one User Equipment (UE) and communication nodes, wherein:
    at least one of the communication nodes is a Policy and Charging Rules Function (PCRF);
    at least one of the communication nodes is a Packet Data Network Gateway (PDN GW);
    one of the communication nodes is an Access Selection Server subscriber Data Base (ASS DB);
    one of the communication nodes is an Application Function (AF); and,
    one of the communication nodes is a Network Management System (NMS); and,
    wherein control of multiple UE accesses is enabled from the ASS by:
        the ASS being arranged to allow each UE to have multiple accesses to at least one PDN GW, each access comprising one Internet-protocol (IP)-session;
        the ASS being arranged to store access information in the memory of all accesses for each UE in the communication network and status information of overall load status of the communication network;

the ASS being arranged to collect the access information through interactions with the communication nodes and a UE, the ASS being further arranged to communicate with the PCRF through a reference point Rx2 or a node-internal interface and for transfer of session information concerning IP-sessions in the PCRF to the ASS;

the ASS being arranged to communicate control messages, based on the access information and the status information, from the ASS to the UE; and, the ASS being arranged to receive the session information from the PCRF, via the reference point Rx2, about the session information stored in a PCRF session data base, the ASS being arranged to report acknowledgement to the PCRF of activation, modification and deactivation of all UE Internet protocol-Connectivity Access Networks (IP-CANs).

2. The ASS according to claim 1, wherein the session information concerning IP sessions comprises Radio Access Technology (RAT) and UE source IP address.

3. The ASS according to claim 1, wherein the control messages comprise access selection criteria.

4. The ASS according to claim 1, wherein the ASS is arranged to be connected to the UE through an IP-based interface.

5. The ASS according to claim 1, wherein the ASS is a separate node and further in that the ASS is arranged to communicate through a reference point Rx1 with the AF to enable the ASS to receive a request from the AF, for updating multi-access policy rules in the UE due to AF session establishment/modification/deactivation, and to receive activation/modification information from the AF concerning activations and modifications of IP-sessions.

6. The ASS according to claim 5, wherein the ASS is arranged to communicate with the PCRF through the reference point Rx2 being an Rx or Gx reference point or an aggregation of an Rx-reference point and a Gx-reference point.

7. The ASS according to claim 1, wherein the ASS is a separate node or the ASS and the PCRF are arranged to be integrated into one logical node or the ASS, the PCRF and the AF are arranged to be integrated into one logical node.

8. The ASS according to claim 7, wherein the ASS is arranged to handle communication with the PCRF through the reference point Rx2 being an Rx or Gx reference point or an aggregation of an Rx-reference point and a Gx-reference point:

for transfer of the session information concerning IP-sessions in the PCRF to the ASS, to enable the ASS to receive a request for updating multi-access policy rules in the UE due to AF session establishment/modification/deactivation from the AF via the Rx reference point and the PCRF, and to handle communication between the AF and the ASS via the Rx reference point and the PCRF.

9. The ASS according to claim 7, wherein the ASS is arranged to receive from the PCRF:

the session information, via the reference point Rx2, about the session information stored in the PCRF session data base in a first new message and in a second new message the ASS is arranged to report acknowledgement to the PCRF of the activation, modification and deactivation of all UE IP-CANs, and a request for updating multi-access policy rules in the UE due to AF session establishment/modification/deactivation from the AF through the reference point Rx2.

10. The ASS according to claim 1, wherein the ASS is arranged to receive the status information about load status for different Radio Access Technologies (RATs) within the communication network from the NMS through a management interface.

11. The ASS according to claim 1, wherein the ASS software is arranged to perform the following steps:

handling a single access or multiple accesses in parallel, guiding the UE in activating, modifying or changing an access in order to request the correct RAT that the ASS software comprises access selection criteria being arranged to be communicated to the UE through an IP-based interface, thus establishing a control of the UE from the ASS.

12. The ASS according to claim 11, wherein the access selection criteria is a direct instruction to the UE to use a certain RAT or a preference list of available RATs for different services arranged to instruct the UE which RAT to use depending on parameters such as location, time of the day and load status.

13. A method for using an Access Selection Server (ASS) comprising enabling control of multiple User Equipment (UE) accesses from the ASS by:

the ASS allowing each UE to have multiple accesses to at least one Packet Data Network Gateway (PDN GW), each access comprising one Internet protocol (IP)-session;

the ASS storing access information in a memory of all accesses for each UE in a communication network and status information of overall load status of the communication network;

the ASS collecting the access information through interactions with communication nodes and a UE in the communication network, the ASS communicating with a Policy and Charging Rules Function (PCRF) through a reference point Rx2 or a node-internal interface and for transfer of session information concerning IP-sessions in the PCRF to the ASS;

the ASS communicating control messages, based on the access information and the status information, from the ASS to the UE; and, the ASS receiving the session information from the PCRF, via the reference point Rx2, about the session information stored in a PCRF session data base, the ASS further reports acknowledgement to the PCRF of activation, modification and deactivation of all UE Internet protocol-Connectivity Access Networks (IP-CANs).

14. A User Equipment (UE) arranged to interact with a communication network, wherein the UE comprises:

a processor and memory, wherein said memory contains instructions to be executed by said processor, whereby said UE is operative to perform an Access Selection Server (ASS) function and to communicate through an Internet protocol (IP)-based interface with an ASS in the communication network, the ASS function in the UE being arranged to handle requests from the ASS to perform activation of new accesses and/or modification or deactivation of existing accesses, the requests from the ASS being based on access information of all accesses for each UE in the communication network and status information of overall load status of the communication network.

15. The UE according to claim 14, wherein the UE is further operative to perform one or more of:

informing the ASS about available passive accesses for the UE and/or geographical location information for the UE, receiving data concerning selection of a Radio Access Technology (RAT), communicating a request for an UE Internet protocol-Connectivity Access Network (IP-CAN) establishment, and initiating for Session Initiation Protocol (SIP) invite/reinvite.

16. The method for using an ASS according to claim 13, wherein the session information concerning IP sessions comprises Radio Access Technology (RAT) and UE source IP address.

17. The method for using an ASS according to claim 13, wherein the control messages comprise access selection criteria.

18. The method for using an ASS according to claim 13, wherein the ASS is arranged to be connected to the UE through an IP-based interface.

19. The method for using an ASS according to claim 13, wherein the ASS is a separate node and further in that the ASS is arranged to communicate through a reference point Rx1 with the AF to enable the ASS to receive a request from the AF, for updating multi-access policy rules in the UE due to AF session establishment/modification/deactivation, and to receive activation/modification information from the AF concerning activations and modifications of IP-sessions.

20. The method for using an ASS according to claim 19, wherein the ASS is arranged to communicate with the PCRF through the reference point Rx2 being an Rx or Gx reference point or an aggregation of an Rx-reference point and a Gx-reference point.

21. The method for using an ASS according to claim 13, wherein the ASS is a separate node or the ASS and the PCRF are arranged to be integrated into one logical node or the ASS, the PCRF and the AF are arranged to be integrated into one logical node.

22. The method for using an ASS according to claim 21, wherein the ASS is arranged to handle communication with the PCRF through the reference point Rx2 being an Rx or Gx reference point or an aggregation of an Rx-reference point and a Gx-reference point:

for transfer of the session information concerning IP-sessions in the PCRF to the ASS, to enable the ASS to receive a request for updating multi-access policy rules in the UE due to AF session establishment/modification/deactivation from the AF via the Rx reference point and the PCRF, and to handle communication between the AF and the ASS via the Rx reference point and the PCRF.

23. The method for using an ASS according to claim 21, wherein the ASS is arranged to receive from the PCRF:

the session information, via the reference point Rx2, about the session information stored in the PCRF session data base in a first new message and in a second new message the ASS is arranged to report acknowledgement to the PCRF of the activation, modification and deactivation of all UE IP-CANs, and a request for updating multi-access policy rules in the UE due to AF session establishment/modification/deactivation from the AF through the reference point Rx2.

24. The method for using an ASS according to claim 13, wherein the ASS is arranged to receive the status information about load status for different Radio Access Technologies (RATs) within the communication network from the NMS through a management interface.

25. The method for using an ASS according to claim 13, wherein the ASS software is arranged to perform the following steps:

handling a single access or multiple accesses in parallel, guiding the UE in activating, modifying or changing an access in order to request the correct RAT that the ASS software comprises access selection criteria being arranged to be communicated to the UE through an IP-based interface, thus establishing a control of the UE from the ASS.

26. The method for using an ASS according to claim 25, wherein the access selection criteria is a direct instruction to the UE to use a certain RAT or a preference list of available RATs for different services arranged to instruct the UE which RAT to use depending on parameters such as location, time of the day and load status.

* * * * *